(12) United States Patent
Yanase et al.

(10) Patent No.: US 8,437,618 B2
(45) Date of Patent: May 7, 2013

(54) CONTENT DATA RECORDING APPARATUS WITH ENCRYPTION BY MEDIA ID

(75) Inventors: Tsutomu Yanase, Hamamatsu (JP); Ikuro Oshima, Machida (JP)

(73) Assignee: Yamaha Corporation, Hamamatsu-shi (JP)

( * ) Notice: Subject to any disclaimer, the term of this patent is extended or adjusted under 35 U.S.C. 154(b) by 1583 days.

(21) Appl. No.: 11/372,562

(22) Filed: Mar. 9, 2006

(65) Prior Publication Data
US 2006/0204210 A1      Sep. 14, 2006

(30) Foreign Application Priority Data

Mar. 11, 2005   (JP) .................................. 2005-070064

(51) Int. Cl.
*H04N 9/80*   (2006.01)
*H04N 5/92*   (2006.01)

(52) U.S. Cl.
USPC ........... 386/252; 386/239; 386/248; 386/259; 386/326

(58) Field of Classification Search ............... 386/46, 386/94, 125, 126, 239–260, 326–342; 380/201, 380/277
See application file for complete search history.

(56) References Cited

U.S. PATENT DOCUMENTS

| | | | | |
|---|---|---|---|---|
| 6,021,464 | A * | 2/2000 | Yao et al. ..................... | 711/114 |
| 6,834,348 | B1 * | 12/2004 | Tagawa et al. ................ | 713/193 |
| 2001/0041046 | A1 | 11/2001 | Wada | |
| 2003/0120942 | A1 * | 6/2003 | Yoshida et al. ............... | 713/193 |
| 2005/0027919 | A1 * | 2/2005 | Aruga ........................... | 710/316 |
| 2005/0080877 | A1 * | 4/2005 | Sako et al. .................... | 709/219 |

FOREIGN PATENT DOCUMENTS

| | | |
|---|---|---|
| EP | 1 018 733 A1 | 7/2000 |
| EP | 1 152 608 A2 | 11/2001 |
| EP | 1 152 608 A3 | 11/2001 |
| EP | 1 411 516 A1 | 4/2004 |
| JP | 2001-319419 | 11/2001 |
| JP | 2003-069734 | 3/2003 |
| JP | 2004-046452 | 2/2004 |
| WO | WO-2004/086370 A2 | 10/2004 |
| WO | WO-2004/086370 A3 | 10/2004 |

OTHER PUBLICATIONS

Notification of Reasons for Refusal for Japanese Patent Application No. 2005-070064, mailed Dec. 16, 2008 (9 pages).
European Search Report mailed May 30, 2011, for EP Patent Application No. 06110844.5, seven pages.

\* cited by examiner

*Primary Examiner* — Thai Tran
*Assistant Examiner* — Hung Dang
(74) *Attorney, Agent, or Firm* — Morrison & Foerster LLP (57) ABSTRACT

In an apparatus capable of mounting a recording medium for recording content data, an information acquisition section acquires protection information from a server, which indicates whether or not content data supplied from the server needs to be protected. A protection determination section determines whether or not the content data needs to be protected according to the protection information. When the content data needs to be protected, an ID determination section further determines whether or not a unique identification code is provided which uniquely identifies a recording medium mounted on the apparatus. When the recording medium has the unique identification, a recording destination settling section settles that recording medium to be a content recording destination. A data acquisition section acquires content data from the server. An encryption section encrypts the acquired content data using the unique identification code. A data recording section records the encrypted content data in the recording medium settled to be the content recording destination.

6 Claims, 5 Drawing Sheets

CONTENT DATA RECORDING APPARATUS WITH ENCRYPTION BY MEDIA ID

BACKGROUND OF THE INVENTION

1. Technical Field

The present invention relates to an information recording system for content data supplied from a server via a network on an appropriate recording medium.

2. Related Art

Conventionally, the copyright protection may be needed when downloading digital contents such as music and video from a server via a communication network and recording them on a recording medium. In such case, as disclosed in Japanese Patent Unexamined Publication No. 2004-46452, for example, there has been known the technology to encrypt and record contents using the recording medium's unique identification code (ID).

The information recording apparatus according to such conventional technology can record content data to be protected only on a recording medium having ID. Recording media as recording destination are limited. When downloaded content data is protected, it can be saved on limited recording media such as, for example, SmartMedia (registered trademark) having ID, flash memory having ID, and terminal (e.g., electronic musical instrument) built-in memory having ID.

In the conventional information recording apparatus, an attempt was made to record content data to be copyright protected irrespectively of whether or not the recording medium is provided with an ID. When the recording medium is provided with no ID, no recording process has been permitted for that content data, whereby the attempt is occasionally in vain.

SUMMARY OF THE INVENTION

The present invention has been made in consideration of the foregoing. It is therefore an object of the present invention to provide an information recording system capable of improving the usability for selecting media to record content data to be protected.

According to one characteristic of the present invention, there is provided an apparatus capable of mounting a recording medium for recording content data, the apparatus comprising: an information acquisition section that acquires protection information from a server, wherein the protection information indicates whether or not content data supplied from the server needs to be protected; a protection determination section that determines whether or not the content data needs to be protected according to the protection information acquired by the information acquisition section; an ID determination section that operates when the protection determination section determines that the content data needs to be protected, for further determining whether or not a unique identification code is provided which uniquely identifies a recording medium mounted on the apparatus; a recording destination settling section that operates when the ID determination section determines that the recording medium has the unique identification code, for settling the recording medium to be a content recording destination; a data acquisition section that acquires the content data from the server; an encryption section that operates when the data acquisition section acquires the content data which is to be protected, for encrypting the content data using the unique identification code; and a data recording section that records the content data encrypted by the encryption section in the recording medium settled to be the content recording destination by the recording destination settling section.

Expediently, the ID determination section may determine that a unique ID is each provided for one or more recording medium mounted on the apparatus. In such a case, the recording destination settling section comprises an information presentation section that presents information about said one or more of the recording medium determined to have each unique identification code by the ID determination section, and a recording destination determination section that determines the content recording destination in accordance with a user operation which is inputted in response to the presenting of the information.

Preferably, the inventive apparatus further comprises a priority holding section that holds priority information which determines priorities among a plurality of recording media mountable on the apparatus, wherein the recording destination settling section settles one of the recording media having the highest priority as the content recording destination according to the priority information. Further preferably, the recording destination settling section searches the plurality of the recording media in the order of their priorities for determining the content recording destination.

The information recording system according to the present invention acquires protection information from the server prior to acquisition of intended content data supplied from the server. The protection information indicates whether or not the content data needs to be protected. According to the acquired protection information, the system may determine that the content data needs to be protected. In this case, the system checks whether or not the recording medium mounted on the information recording apparatus has a unique identification code (unique ID). The system automatically determines the recording medium having unique ID as a content recording destination. Then, the acquired content data may be content data to be protected. In this case, the system encrypts the content data using the unique ID provided for the recording medium as the content recording destination. The system records the encrypted content data on the recording medium having the unique ID.

According to the present invention, the server delivers content data and also transmits protection information indicating whether or not protection is needed. When the protection is needed, the unique ID of a recording medium mounted at that time is used to automatically select a recording destination for the content data. It is possible to appropriately and easily select a recording medium that records content data to be protected depending on the need for the copyright protection.

According to the present invention, a storage device stores priority information indicating priorities of possible recording destinations, i.e., multiple recording media mountable on the information recording apparatus or connectable to the corresponding interface portions. When there are multiple possible recording destinations, the content recording destination is determined according to the priorities in the priority information. In a case of mounting multiple recording media having unique IDs, the appropriate recording medium can be selected as a content recording destination in accordance with the specified priorities.

The information recording system according to the present invention may determine that the content data needs to be protected according to the protection information acquired prior to delivery of the content data. The system extracts one or more of recordable recording media having unique IDs from all the recording media mounted on the information recording apparatus. The system provides a user with information about the extracted recording media having unique IDs and allows the user to select one content recording destination. According to the present invention, it is possible to appropriately and easily select a recording medium for recording content data requiring the copyright protection according to user's intention.

BRIEF DESCRIPTION OF THE DRAWINGS

FIGS. 2(1) and 2(2) are a diagram showing a conceptual diagram and a process flow of content recording in the information recording system according to the embodiment of the present invention.

DETAILED DESCRIPTION OF THE INVENTION

[System Overview]

Figure 1:
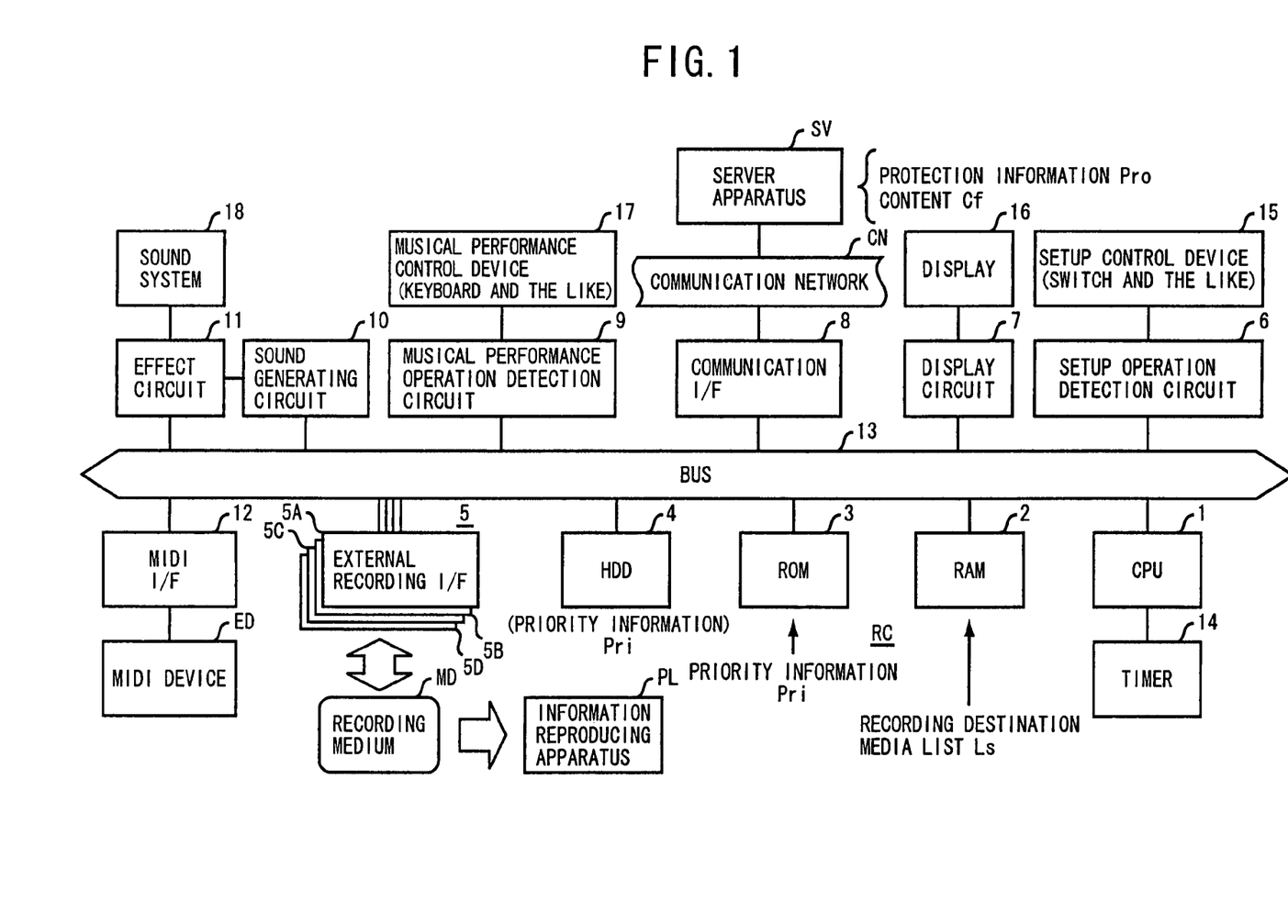
FIG. 1 is a block diagram showing the hardware configuration of an information recording system according to an embodiment of the present invention.
Figure 2:
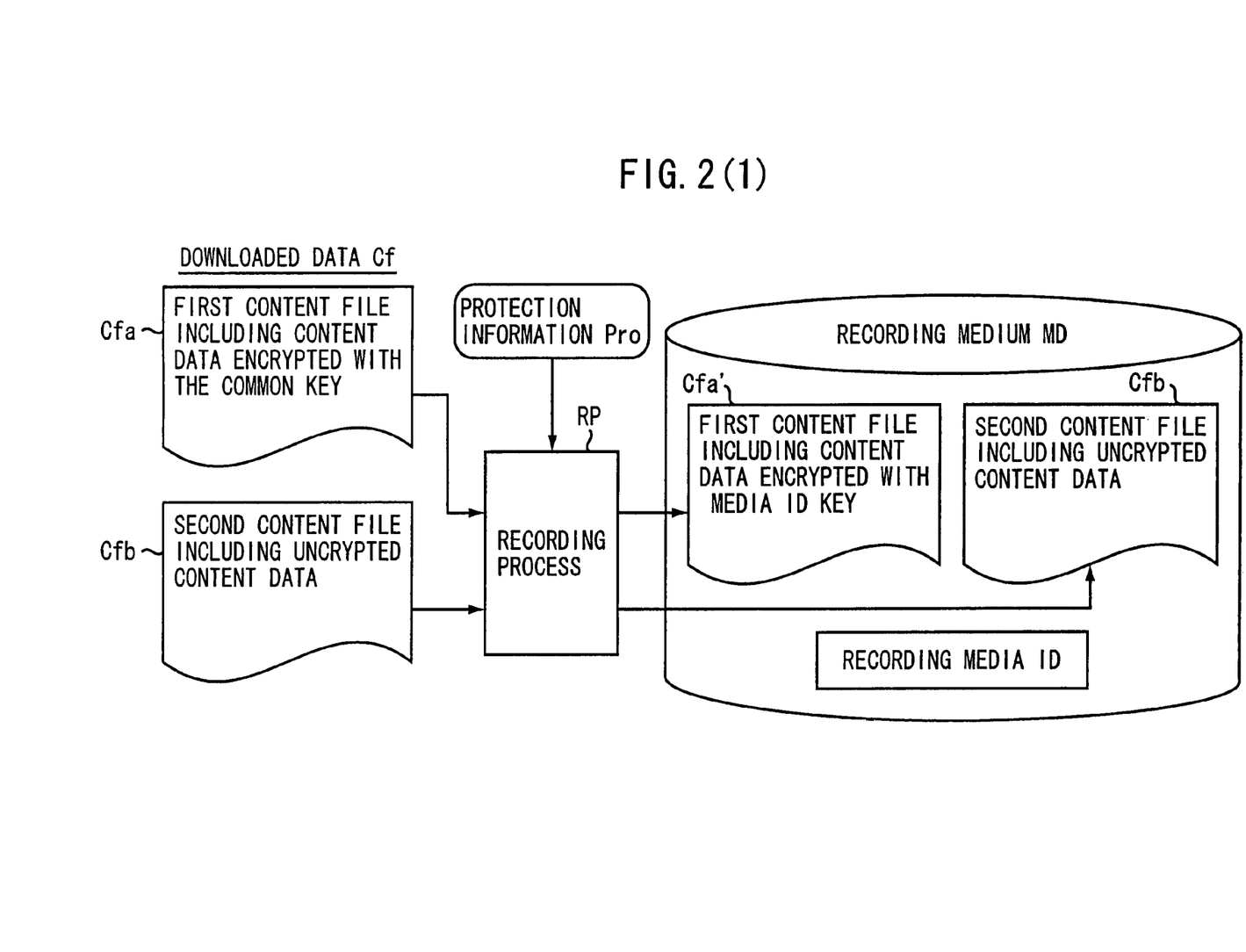

FIG. 1 is a block diagram showing the hardware configuration of an information recording system according to an embodiment of the present invention. An information recording apparatus (also referred to simply as a "recording apparatus") RC forms the core of the information recording system and is equivalent to a type of computer having the communication function. This example uses an electronic musical apparatus having the information reproducing function and the music information processing function as well. The information recording apparatus RC is provided with a central processing unit (CPU) 1, random access memory (RAM) 2, read-only memory (ROM) 3, a hard disk drive (HDD) 4, an external recording interface (I/F) 5, a setup operation (panel) detection circuit 6, a display circuit 7, a communication interface (I/F) 8, a musical performance operation detection circuit 9, a sound generating circuit 10, an effect circuit 11, and a MIDI interface (I/F) 12. These components 1 through 12 are connected with each other through a bus 13.

In accordance with a specified control program, the CPU 1 uses clocks generated from a timer 14 to execute various processes such as an information recording process called a "content recording process". The RAM 2 is used as a work area to temporarily store various data needed for these processes. For example, the RAM 2 secures areas for temporarily storing protection information Pro and content Cf supplied from a server apparatus SV and a recording destination medium list Ls used to determine a recording destination. The ROM 3 is a kind of machine readable medium and stores various programs and control data needed to perform these processes. For example, the control data includes priority information Pri indicative of the priority of a recording medium (MD) that records data needed to be protected during the content recording process.

Specifically, the ROM 3 contains program instructions executable by the CPU 1 for causing the recording apparatus RC to perform a method of recording content data comprising the steps of acquiring protection information from a server, wherein the protection information indicates whether or not content data supplied from the server needs to be protected; determining whether or not the content data needs to be protected according to the acquired protection information; when the content data needs to be protected, further determining whether or not a unique identification code is provided which uniquely identifies a recording medium mounted on the recording apparatus; settling the recording medium to be a content recording destination when the recording medium has the unique identification code; acquiring content data from the server; encrypting the content data using the unique identification code when the content data is acquired which is to be protected; and recording the encrypted content data in the recording medium settled to be the content recording destination.

The HDD 4 functions as an external storage apparatus included in the recording apparatus RC that drives a hard disk (HD) used as a built-in storage medium. The HD can save necessary control programs and data. For example, the HD can store user-edited priority information Pri.

The external recording I/F 5 provides an interface for mounting various external recording media MD such as SmartMedia (registered trademark), USB memory, MO, removable HDs, digital versatile disks (DVDs), compact disks (CDs), and flexible disks (FDs). There are provided multiple external recording I/Fs 5A through 5D. In FIG. 1, recording media (also referred to simply as "media") are each mounted on the external recording I/Fs 5A through 5D and are represented by common reference symbol "MD". The information recording apparatus RC can reproduce data stored in each recording medium MD. The data can be also reproduced on another information reproducing apparatus PL.

In the following description, the recording media MD include a SmartMedia card, first and second USB memories, and an FD. The SmartMedia card and the first and second USB memories each have prerecorded unique recording media IDs for identifying each medium (also referred to simply as "media IDs"). The four recording media MD are provided with the external recording I/Fs 5A through 5D as mentioned above.

That is, the first external recording I/F 5A corresponds to a slot capable of mounting the SmartMedia card. The second external recording I/F 5B corresponds to a first USB terminal capable of connecting the first USB memory. The third external recording I/F 5C corresponds to a second USB terminal capable of connecting the second USB memory. The fourth external recording I/F 5D corresponds to a flexible disk drive (FDD) for driving the FD. According to the priority information Pri, the recording media MD are assigned with priorities concerning recording destinations in the order of (1) SmartMedia card, (2) first USB memory, (3) second USB memory, and (4) FD, for example.

The setup operation detection circuit 6 is also referred to as a panel detection circuit. The circuit 6 detects setup operations by means of a setup control device (panel control device) 15 such as a key switch and a mouse tool, and supplies the system with the corresponding setup information. The display circuit 7 is provided with a display 16 such as an LCD and various indicators (not shown). The display circuit 7 controls display or indication contents according to instructions from the CPU 1 and provides visual supports for operations of the setup control device 15. The display circuit 7 can also display reproduction video according to image data from the HDD 4 and the external recording I/F 5 on the display.

The communication I/F 8 connects with a communication network CN such as the Internet. The communication I/F 8 receives control programs, control data containing protection information Pro, and various content data Cf. Depending on needs, the communication I/F 8 can save these programs and data on the HDD 4 and recording media MD connected to the external recording I/F 5.

The musical performance operation detection circuit 9 detects operations of a musical performance control device 17 such as a keyboard instrument, and provides the system with the corresponding musical performance information. The sound generating circuit 10 and the effect circuit 11 (including software) having an effect providing DSP generate musical sound signals based on musical performance information from the musical performance control device 17 and music data from the HDD 4 and the external recording I/F 5. A sound system 18 has a D/A conversion portion, an amplifier, and a speaker. The sound system 18 can generate musical sounds based on musical sound signals from the effect circuit 11, and can generate musical performance sounds according to the musical performance information and reproduction musical sounds in accordance with music data. A MIDI I/F 12 connects with another MIDI musical device ED and exchanges MIDI data with the MIDI musical device ED so that the information recording apparatus RC can use the MIDI data.

The information recording apparatus RC does not necessarily have the music information processing function or the information reproducing function. The information recording apparatus RC may or may not be equipped with an musical performance operation portion composed of musical performance operation detection circuit 9 and the musical performance control device 17, a musical sound generation portion composed of the sound generating circuit 10, the effect circuit 11, and the sound system 18, and the MIDI I/F 12.

The server apparatus (also referred to simply as a "server") SV has the same hardware configuration as that of a general computer. Similarly to the information recording apparatus RC, the server apparatus SV is equipped with a CPU, RAM, ROM, an external storage device (e.g., HDD), an input operation device (control devices such as a keyboard and a mouse and an associated detection circuit), and a display output portion (display panel and display circuit). The server apparatus SV is connected to the communication network CN via the communication I/F. The server apparatus SV's external storage device stores various content data Cf such as music data in the form of MIDI or audio signals, image data, and the like. The server apparatus SV functions as a content delivery site.

An information reproducing apparatus (also referred to simply as a "reproducing apparatus") is used to reproduce data recorded on the recording medium MD. The information reproducing apparatus PL can have the same hardware configuration as that of the information recording apparatus RC and may or may not have the communication I/F 12.

[Overview of Content Recording]

The information recording system according to an embodiment of the present invention uses protection information acquired before acquisition of content data supplied from the server apparatus to determine whether or not the content data needs to be protected. When the content data needs to be protected, the system automatically selects a recording medium having a unique recording medium ID as a content data recording destination. The system can encrypt the content data using the recording destination medium's unique ID and record the encrypted content data on the recording destination medium. FIG. 2 shows a conceptual diagram and a process flow of content recording in the information recording system according to the embodiment of the present invention.

As shown in the conceptual diagram of FIG. 2(1), the information recording system according to the embodiment of the present invention can download two types of content data Cf from the server apparatus SV. One is first content file Cfa referred to as "protected content". The first content file Cfa contains content data encrypted with a common key. The other is a second content file Cfb referred to as a "free content". The second content file Cfb contains uncrypted content data.

The information recording apparatus RC receives these content files Cfa and Cfb from the server apparatus SV. The information recording apparatus RC then allows a recording function portion RP to perform specified recording processes according to protection information Pro received before reception of the content. The information recording apparatus RC can record these content files on a specified recording medium MD through the external recording I/F 5. The recording medium MD is a small memory card called SmartMedia, for example. A unique media ID is prerecorded on the recording medium MD.

The first content file, i.e., the protected content Cfa, contains data that needs protection and is encrypted using the common key. The common key is independent of recording media MD. The common key is not publicly known but is known to only a specified recording apparatus (e.g., this information recording apparatus RC) and the server apparatus SV. The information recording apparatus RC may download a content that is then found to be protected content Cfa according to protection information Pro. The recording function portion RP decrypts the protected content Cfa using the common key. The recording function portion RP further encrypts that content using, as a key, the media ID of a recording medium (recording destination medium) MD as a recording destination. The encrypted protected content Cfa' is recorded on the recording destination medium MD.

Accordingly, the recording medium MD that records protected content Cfa' can be mounted on the external recording I/F 5 corresponding to the information recording apparatus RC or another information reproducing apparatus PL's external recording I/F. Protected content Cfa' can be reproduced by decrypting it using the recording medium MD's media ID key. However, protected content Cfa' on the recording medium MD is encrypted with the original recording medium MD's media ID. Protected content Cfa' cannot be copied to other recording media. Even though data can be copied, the copied data cannot be reproduced on the information recording apparatus RC or the information reproducing apparatus PL. In this manner, the copyright is protected.

By contrast, the second content file, i.e., free content Cfb, contains data that requires no protection and is not encrypted. The information recording apparatus RC may download a content that is then found to be free content Cfb according to protection information Pro. The free content Cfb is straight recorded on a specified recording medium MD. While free content Cfb need not be encrypted, it may be encrypted similarly to protected content Cfa and may be decrypted by the recording function portion RP after downloading. This is because it is possible to simplify procedures for exchanging data between the content delivery site using the server apparatus SV and the information recording apparatus (electronic musical apparatus) RC.

Available recording media MD for recording contents include not only the above-mentioned SmartMedia card, but also USB memory, MO, removable HD, DVD, CD, DVD, and FD. When a recording medium MD itself is provided with the media ID, the encrypted protected content Cfa' can be written to the recording medium MD. The information recording apparatus RC according to the embodiment uses SmartMedia cards and USB memories as representatives of the recording medium MD having media ID.

FIG. 2(2) is a flowchart showing a content recording process performed by the recording function portion RP in the information recording apparatus RC. The information recording apparatus RC determines a content file to download. The information recording apparatus RC notifies the server apparatus SV that the content file is to be delivered. After this, the process flow starts.

When this content receiving and recording process starts, the server apparatus SV transmits protection information Pro about the protection of the specified content file to the information recording apparatus RC via the communication network CN and the communication I/F 8. Protection information Pro is transmitted as a small file (metafile). At Step S1, the CPU stores the file in a specified area of the RAM 2 to acquire protection information Pro.

At Step S2, the CPU 1 checks the recording medium connection or mount state of the external recording I/F 5 to see whether or not a corresponding recording medium MD is mounted on each of the external recording I/Fs 5A through 5D. When protection information Pro indicates that the protection is needed, the CPU 1 further checks whether or not the media ID is provided for the recording medium MD mounted on each of the external recording I/Fs 5A through 5D. The CPU 1 executes a recording destination determination process that determines a content recording destination.

There may be multiple recording medium candidates extracted or detected as content recording destinations. In such case, the recording destination medium MD can be automatically selected according to priority information Pri stored in the ROM 3 or the HDD 4. Alternatively, a user can determine the recording destination medium MD by choosing from indicated recording medium candidates for the recording destination medium MD.

At Step S3, the CPU 1 determines whether or not there is an appropriate recording destination for the content based on the result of the recording destination determination process at Step S2. When there is no appropriate recording destination (NO at S3), the CPU 1 allows the display 16 to display that there is no appropriate recording destination and the content downloading stops. The CPU 1 then terminates the recording process.

When it is determined at Step S3 that an appropriate recording destination is available, the process proceeds to step S4. The CPU 1 downloads the content file Cfa and stores it in a specified area of the RAM 2. At Step S5, the CPU 1 determines whether or not protection information Pro acquired at Step S1 indicates that the content needs to be "protected".

There may be a case of determining that the specified content file needs to be "protected" according to the protection information and is accordingly proved to be protected content Cfa (YES at S5). In this case, the process proceeds to Steps S6 through S8 in order. At Step S6, the CPU 1 uses the common key to decrypt downloaded content file Cfa. At Step S7, the CPU 1 generates content file Cfa' encrypted by using recording media ID as a key. At Step S8, the CPU 1 records the generated encrypted content Cfa' on the appropriate recording medium MD and terminates the recording process.

On the other hand, there may be a case of determining at Step S5 that the specified content file need not be "protected" (no protection needed) according to the protection information and is accordingly found to be free content Cfb (NO at S5). In this case, the process immediately proceeds to Step S8. The CPU 1 straight records downloaded content file Cfb on the recording medium MD and terminates the recording process.

In this manner, the information recording system according to the embodiment of the present invention previously acquires protection information Pro from the server (S1). Protection information Pro indicates whether or not the protection is needed for content Cf which is scheduled to be delivered from the server. According to the necessity of protection indicated by protection information Pro, the system checks if there is available a recording medium mounted on the information recording apparatus RC or and having a unique media ID. The system then determines the recording medium MD as content recording destination (S2). When multiple recording destinations are available, the CPU 1 automatically selects the recording destination medium MD according to priorities indicated by priority information Pri. Alternatively, the CPU 1 visually presents a user with multiple recording destination medium candidates so that the user can select a recording destination medium MD. The CPU 1 acquires intended content Cf from the server (S4). When the acquired content Cf is the protected content Cfa (YES at S5), the CPU 1 encrypts the content using the media ID unique to the recording destination medium MD (S7). The CPU 1 records the encrypted content Cfa' on the recording destination medium MD (S8). When the acquired content Cf is free content Cfb requiring no protection (NO at S5), the CPU 1 straight records the content on the recording destination medium MD.

[Recording Destination Determination Process [1] (Automatic)]

Figure 3:
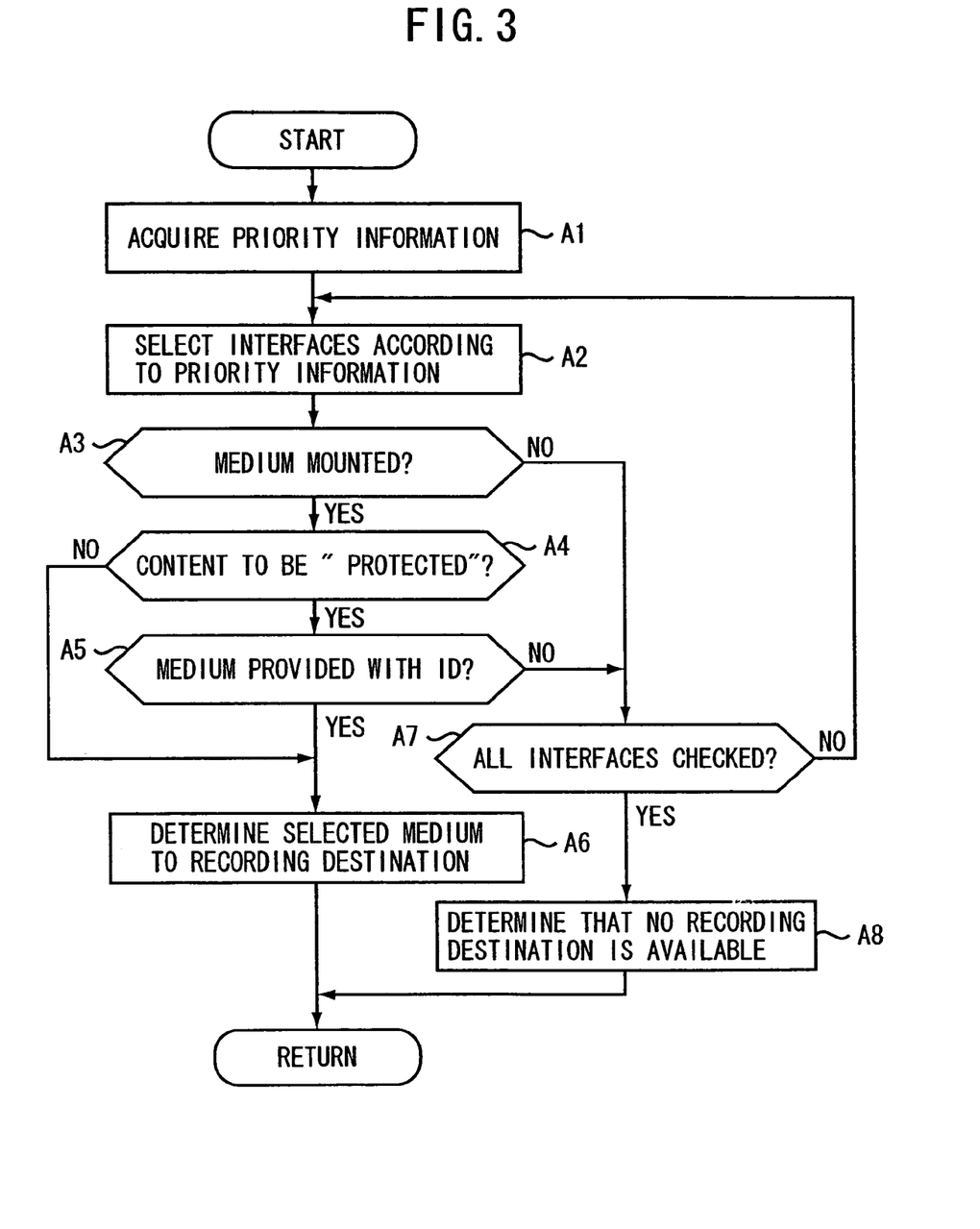
FIG. 3 is a flowchart showing a first recording destination determination process (automatic) according to the embodiment of the present invention.

FIG. 3 is a flowchart showing a recording destination determination process [1] (automatic) according to the embodiment of the present invention. The recording destination determination process [1] corresponds to the recording destination determination process performed at the second step, i.e., Step S2, of the recording process in FIG. 2(2). More specifically, the recording destination determination process [1] describes the case of automatically determining the content recording destination based on priority information Pri.

According to the process flow as mentioned above, the ROM 3 (or the HDD 4) of the information recording apparatus RC stores priority information Pri. The external recording I/Fs 5A through 5D are provided with the SmartMedia card, the first and second USB terminals, and the FDD. Priority information Pri specifies recording destination priorities in descending order of (1) SmartMedia card, (2) first USB memory, (3) second USB memory, and (4) FD, for example.

The CPU 1 acquires protection information Pro at Step S1 of the content recording process in FIG. 2(2) and then proceeds to Step S2 to start recording destination determination process [1] in FIG. 3. At the first step, i.e., at step A1, the CPU 1 acquires priority information Pri from the ROM 3 (or the HDD 4). At Step A2, the CPU 1 selects one external recording I/F 5 out of multiple external recording I/Fs 5A through 5D in accordance with priorities indicated by this priority information Pri. The CPU 1 sequentially performs checks at Step A3 and later. When the process first proceeds to Step A2, for example, the CPU 1 checks the first external recording I/F 5A.

At Step A3, the CPU 1 determines whether or not the selected external recording I/F 5 is mounted with a recording medium MD. When a recording medium MD is mounted (YES at A3), the process proceeds to Step A4. The CPU 1 references protection information Pro acquired at Step S1 (FIG. 2(2)) to determine whether or not the specified content needs to be "protected". When the content needs to be "protected" (YES at A4), the process proceeds to Step A5. Further, the CPU 1 determines whether or not a media ID is provided for the recording medium MD mounted on the external recording I/F 5.

At Step A4, the CPU 1 may determine that the content need not be "protected" (NO at A4). Alternatively, at Step A5, the CPU 1 may determine that the recording medium MD is provided with a media ID. In either case, the CPU 1 proceeds to Step A6 to determine the recording destination, i.e., the recording medium MD mounted on the currently selected external recording I/F 5. Subsequently, the CPU 1 terminates the recording destination determination process [1] and returns to Step 3 of the content recording process [FIG. 2(2)].

When it is determined that the content needs to be "protected", for example, the CPU 1 may check the first external recording I/F 5A to detect a SmartMedia card mounted. The CPU 1 proceeds to Steps A3 through A5. At Step A6, the CPU 1 determines the SmartMedia card to be the recording destination medium MD.

On the other hand, no recording medium MD may be mounted on the currently selected external recording I/F 5 (NO at A3). Alternatively, no media ID may be provided for the recording medium MD (NO at A5). In either case, the CPU 1 proceeds to Step A7 to determine whether or not all the external recording I/Fs 5A through 5D are checked for mounting of recording media MD or for the presence or absence of recording medium corresponding to the content to be protected. When all the external recording I/Fs 5A through 5D are not completely checked, the CPU 1 returns to Step A2.

Returning to Step A2, the CPU 1 selects the external recording I/F 5 corresponding to the next priority indicated by priority information Pri and performs the process at the above-mentioned Step A3 and later. When the content needs to be "protected", for example, the CPU 1 proceeds to Step A2 for the second time and may detect that the first USB memory is mounted on the second external recording I/F 5B. In this case, the CPU 1 proceeds to Steps A3 through A5. Then, at Step A6, the CPU 1 determines the first USB memory to be the recording destination medium MD and terminates the recording destination determination process [1]. When the first and second external recording I/Fs 5A and 5B are not mounted with the corresponding recording media (SmartMedia card and first USB memory), the CPU 1 proceeds to Step A7 again.

There may be a case where no recording destination is determined and all the external recording I/Fs 5A through 5D are not checked (NO at A7). In such case, the CPU 1 returns to Step A2 to sequentially selects the external recording I/F 5 corresponding to the next priority and repeats the process at Step A3 and later. The CPU 1 proceeds to Step A6 and determines the recording destination medium MD to terminate the recording destination determination process [1]. In another case, no recording destination may be determined after all the external recording I/Fs 5A through 5D are checked completely (YES at A7). In this case, the CPU 1 proceeds to Step A8 to determine that no recording destination is available. The CPU 1 then terminates the recording destination determination process [1] and returns to Step S3 of the content recording process [FIG. 2(2)].

[Recording Destination Determination Process [2] (User-Selection)]

Figure 4:
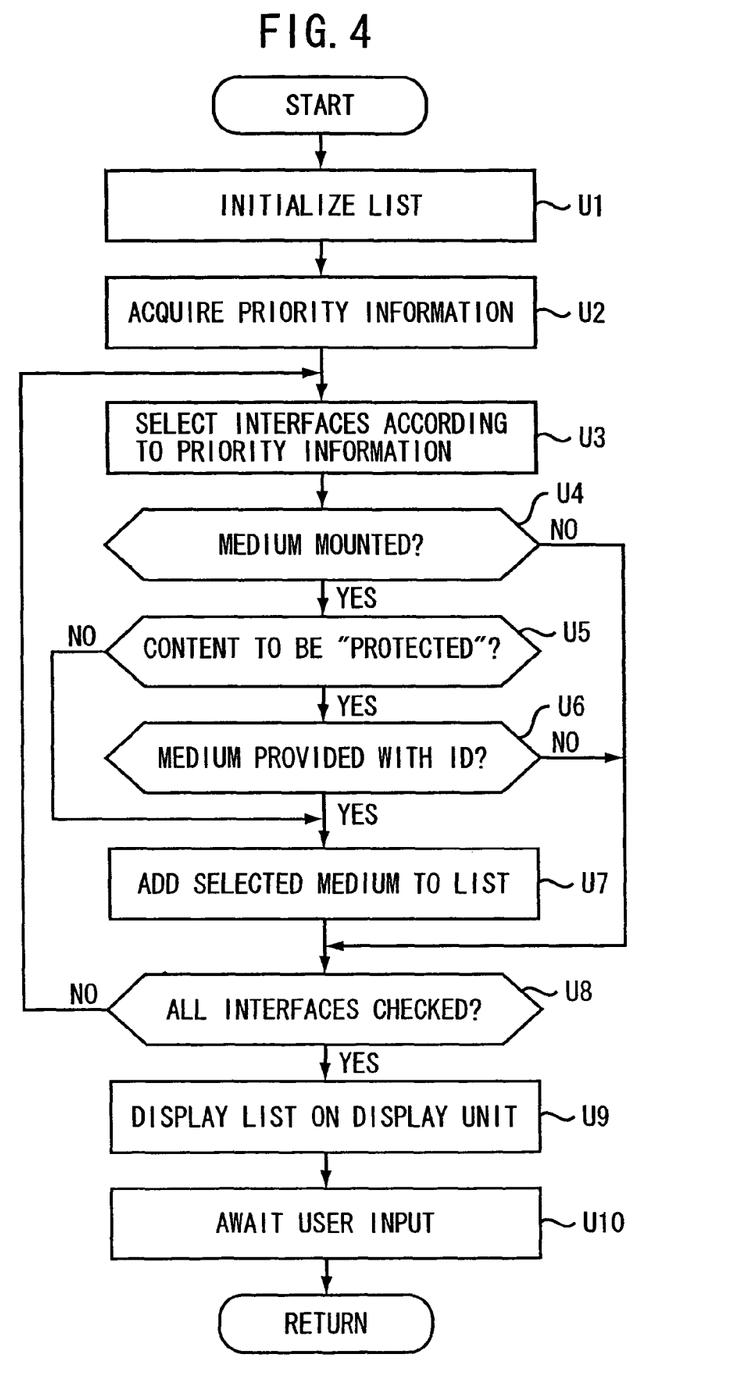
FIG. 4 is a flowchart showing a second recording destination determination process (user-selection) according to the embodiment of the present invention.

FIG. 4 is a flowchart showing the recording destination determination process [2] (user-selection) according to the embodiment of the present invention. The recording destination determination process [2] corresponds to the recording destination determination process performed at the second step, i.e., Step S2, of the recording process in FIG. 2(2). More specifically, the recording destination determination process [2] describes the case of determining the content recording destination based on user operations. The process provides recording destination medium list Ls that contains recording media satisfying a specified condition as recording destination medium candidates. The process determines a final recording destination medium MD according to a user's operation of selection from the provided list Ls.

The CPU 1 acquires protection information Pro at Step S1 of the content recording process in FIG. 2(2) and then proceeds to Step S2 to start recording destination determination process [2] in FIG. 4. At the first step, i.e., at step U1, the CPU 1 initializes recording destination medium list Ls in the RAM 2. At Step U2, the CPU 1 acquires priority information Pri from the ROM 3 (or HDD 4). At Step U3, the CPU 1 selects one external recording I/F 5 from multiple external recording I/Fs 5A through 5D according to priorities indicated by the acquired priority information Pri. The CPU 1 checks whether or not the selected external recording I/F 5 satisfies specified conditions at the following Steps U4 through U7.

At Step U4, the CPU 1 determines whether or not the selected external recording I/F 5 is mounted with a recording medium MD. When a recording medium MD is mounted (YES at U4), the CPU 1 proceeds to Step U5. At Step U5, the CPU 1 references the protection information Pro acquired at Step S1 [FIG. 2(2)] and determines whether or not the specified content needs to be "protected". When the content needs to be "protected" (YES at U5), the CPU 1 proceeds to Step U6. Further, the CPU 1 determines whether or not a media ID is provided for the recording medium MD mounted on the external recording I/F 5.

At Step U5, the CPU 1 may determine that the content need not be "protected" (NO at U5). At Step U6, the CPU 1 may determine that the recording medium MD is provided with a media ID (YES at U6). In either case, the CPU 1 proceeds to Step U7. At Step U7, the CPU 1 determines the recording destination medium, i.e., the recording medium MD mounted on the currently selected external recording I/F 5 and adds the recording medium MD to recording destination medium list Ls.

After the process of determining the media candidate at Step U7, the CPU 1 may determine that no recording medium MD is mounted on the currently selected external recording I/F 5 at Step U4. At Step U6, the CPU 1 may determine that no media ID is provided for the recording medium MD. In either case, the CPU 1 proceeds to Step U8 to determine whether or not all the external recording I/Fs 5A through 5D are checked for mounting of recording media MD or for media IDs on the recording media MD.

When all the external recording I/Fs 5A through 5D are not completely checked, the CPU 1 returns to Step U3. The CPU 1 sequentially selects the external recording I/F 5 corresponding to the next priority. The CPU 1 repeats the process at the above-mentioned Steps U3 through U8 while all the external recording I/Fs 5A through 5D are not checked (NO at U8). In this manner, the CPU 1 extracts recording media MD satisfying the specified conditions as recording destination medium candidates.

The CPU 1 may determine that all the external recording I/Fs 5A through 5D are completely checked and all recording destination medium candidates are extracted (YES at U8). In this case, the CPU 1 proceeds to Step U9 to display recording destination medium list Ls on the display 16. The list contains a listing of information that represents all the extracted recording destination medium candidates.

At Step U10, the CPU 1 awaits a user's input operation corresponding to the displayed recording destination medium list Ls. When a user's input operation is detected, the CPU 1 determines the recording medium MD corresponding to the input as a recording destination. For example, user operations may include a selection operation to specify one of recording destination medium candidates displayed in the recording destination medium list Ls, a cancel operation to select a cancel button displayed along with the list Ls, and the like. When the selection operation is performed, the CPU 1 determines the specified recording destination medium candidate to be a recording medium. When the cancel operation is performed, the CPU 1 performs a process to notify that an appropriate recording destination is unavailable.

When determining the recording destination at Step U10, the CPU 1 terminates the recording destination determination process [2] and returns to Step S3 of the content recording process [FIG. 2(2)].

[Various Embodiments]

While there have been described the preferred embodiments of the present invention with reference to the accompanying drawings, it is to be distinctly understood that the embodiment is only an example and the present invention may be otherwise variously embodied within the spirit and scope of the invention. According to the embodiment, for example, common priority information Pri is used for protected content Cfa requiring protection and free content Cfb requiring no protection to determine the recording destination or to extract recording destination candidates. Further, different priority information may be provided for protected content Cfa and free content Cfb.

The embodiment determines the recording destination medium MD according to the specified procedure independently of the contents of protection information Pro. Moreover, free content Cfb may be recorded on any recording medium (e.g., user-specified recording destination) including a built-in HD of the HDD 4. In this case, protection information Pro indicates that free content Cfb requires no protection. It may be preferable to determine a recording destination medium MD with unique media ID only for protected content Cfa. In this case, protection information Pro indicates that protected content Cfa needs to be "protected". There may be multiple recording medium candidates having media IDs as recording destinations of the content to be "protected". In such case, the recording destinations can be determined in accordance with priority information Pri or user's selection operations.

According to the embodiment, the built-in HD is assumed to be a recording medium having no unique media ID. There may be a built-in HD whose serial number is equivalent to an ID readable by the CPU. Such built-in HD may be assumed to be a recording medium having unique media ID.

Lastly, according to one characteristic of the present invention, there is provided an information recording apparatus (CR; computer, electronic musical apparatus) comprising: information acquisition means (S1) for acquiring protection information (Pro) from a server (SV), wherein the protection information indicates whether or not content data (Cf) supplied from the server needs to be protected; protection determination means (S2; A4) for determining whether or not the content data (Cf) needs to be protected according to protection information (Pro) acquired by the information acquisition means (S1); ID determination means (S2; A5) for, when the protection determination means (A4) determines that the content data (Cf) needs to be protected (YES at A4), determining whether or not a unique ID is provided for a recording medium (MD) mounted on this information recording apparatus (CR); recording destination settling means (S2; A6) for, when the ID determination means (A5) determines a recording medium (MD) to have a unique ID, settling the recording medium to be a content recording destination; data acquisition means (S4) for acquiring the content data (Cf) from the server (SV); encryption means (S7) for, when the data acquisition means (S4) acquires content data (Cf) which is content data (Cfa) to be protected (YES at S5), encrypting the content data using the unique ID; and data recording means (S8) for recording content data (Cfa') encrypted by the encryption means (S7) on a recording medium (MD) settled to be a content recording destination by the recording destination settling means (A6).

Further, there is provided an information recording program which allows a computer (CR; information recording apparatus, electronic musical apparatus) to perform a procedure comprising: an information acquisition step (S1) of acquiring protection information (Pro) from a server (SV), wherein the protection information indicates whether or not content data (Cf) supplied from the server needs to be protected; a protection determination step (S2; A4) of determining whether or not the content data (Cf) needs to be protected according to protection information (Pro) acquired at the information acquisition step (S1); an ID determination step (S2; A5) of, when the protection determination step (A4) is used to determine that the content data (Cf) needs to be protected (YES at A4), determining whether or not a unique ID is provided for a recording medium (MD) mounted on a computer (CR); a recording destination settling step (S2; A6) of, when the ID determination step (A5) is used to determine a recording medium (MD) to have a unique ID, settling the recording medium to be a content recording destination; a data acquisition step (S4) of acquiring the content data (Cf) from the server (SV); an encryption step (S7) of, when the data acquisition step (S4) is used to acquire content data (Cf) which is content data (Cfa) to be protected (YES at S5), encrypting the content data (Cfa) using the unique ID; and a data recording step (S8) of recording content data (Cfa') encrypted at the encryption step (S7) on a recording medium (MD) settled to be a content recording destination at the recording destination settling step (A6). The descriptions in parentheses denote corresponding reference numerals and the like used in embodiments described for ease of understanding.

The information recording apparatus (CR) according to this characteristic can be configured to further comprise priority holding means (3, 4) for holding priority information (Pri) about multiple recording media (MD) mountable on this information recording apparatus (CR), wherein the recording destination settling means (A6) settles the content recording destination according to the priority information (Pri).

According to another characteristic of the present invention, there is provided an information recording apparatus (CR; computer, electronic musical apparatus) comprising: information acquisition means (S1) for acquiring protection information (Pro) from a server (SV), wherein the protection information indicates whether or not content data (Cf) supplied from the server needs to be protected; protection determination means (S2; U5) for determining whether or not the content data (Cf) needs to be protected according to protection information (Pro) acquired by the information acquisition means (S1); ID determination means (S2; U6) for, when the protection determination means (U5) determines that the content data (Cf) needs to be protected (YES at U5), determining whether or not a unique ID is provided for a recording medium (MD) mounted on this information recording apparatus (CR); information presentation means (S2; U9) for presenting information (Ls) about a recording medium (MD) determined to have a unique ID by the ID determination means (U6); recording destination settling means (S2; U10)

for settling a recording medium (MD) to become a content recording destination in accordance with a user operation inputted in response to the information presentation (Ls); data acquisition means (S4) for acquiring the content data (Cf) from the server (SV); encryption means (S7) for, when the data acquisition means (S4) acquires the content data (Cf) which is content data (Cfa) to be protected (YES at S5), encrypting the content data (Cfa) using the unique ID; and data recording means (S8) for recording content data (Cfa') encrypted by the encryption means (S7) on a recording medium (MD) settled to be a content recording destination by the recording destination settling means.

Moreover, there is provided an information recording program which allows a computer (CR; information recording apparatus, electronic musical apparatus) to perform a procedure comprising: an information acquisition step (S1) of acquiring protection information (Pro) from a server (SV), wherein the protection information indicates whether or not content data (Cf) supplied from the server needs to be protected; a protection determination step (S2; U5) of determining whether or not the content data (Cf) needs to be protected according to protection information (Pro) acquired at the information acquisition step (S1); an ID determination step (S2; U6) of, when the protection determination step (U5) is used to determine that the content data (Cf) needs to be protected (YES at U5), further determining whether or not a unique ID is provided for a recording medium (MD) mounted on a computer (CR); an information presenting step (S2; U9) of, when the ID determination step (U6) is used to determine a recording medium to have a unique ID, presenting information (Ls) about the recording medium (MD); a recording destination settling step (S2; U10) of settling a recording medium (MD) to become a content recording destination in accordance with a user operation inputted in response to the information presentation (Ls); a data acquisition step (S4) of acquiring the content data (Cf) from the server (SV); an encryption step (S7) of, when the data acquisition step (S4) is used to acquire content data (Cf) which is content data (Cfa) to be protected (YES at S5), encrypting the content data (Cfa) using the unique ID; and a data recording step (S8) of recording content data (Cfa') encrypted at the encryption step (S7) on a recording medium (MD) settled to be a content recording destination at the recording destination settling step (U10).

The information recording system according to the present invention acquires protection information (Pro) from the server (SV) prior to acquisition (S4) of intended content data (Cf) supplied from the server (SV). The protection information (Pro) shows whether or not the content data (Cf) needs to be protected. According to the acquired protection information (Pro), the system may determine that the content data (Cf) needs to be protected (YES at A4). In this case, the system checks (A5) whether or not the recording medium (MD) mounted on the information recording apparatus (CR) has a unique ID. The system automatically determines (S2; A6) the recording medium (MD) having the unique ID as a content recording destination. Then (S4), the acquired content data (Cf) may be proved content data (Cfa) to be protected (YES at S5). In this case, the system encrypts (S7) the content data (Cfa) using the unique ID provided for the recording medium (MD) as the content recording destination. The system records (S8) the encrypted content data (Cfa') on the recording medium (MD) having the unique ID.

According to the present invention, the server delivers content data and also transmits protection information indicating whether or not protection is needed. When the protection is needed, the unique ID of a recording medium mounted at that time is used to automatically select a recording destination for the content data. It is possible to appropriately and easily select a recording medium that records content data to be protected depending on the need for the copyright protection.

According to the present invention, the storage means (3, 4) stores priority information (Pri) indicating priorities of recording destinations, i.e., multiple recording media (MD) mountable on the information recording apparatus (CR) through the corresponding interface portions (5; 5A through 5D). When there are multiple possible recording destinations, the content recording destination is determined according to the priorities in the priority information (Pri). In a case of mounting multiple recording media having unique IDs, the appropriate recording medium can be selected as a content recording destination in accordance with the specified priorities.

The information recording system according to the present invention may determine (YES at U5) that the content data (Cf) needs to be protected according to the protection information (Pro) acquired prior to delivery of the content data (Cf). The system extracts (U6, U7) recordable recording media (MD) having unique IDs from the recording media (MD) mounted on the information recording apparatus (CR). The system provides a user with information (Ls) about the extracted recording media (MD) having unique IDs, and allows the user to select content recording destinations (S2; U9, U10). According to the present invention, it is possible to appropriately and easily select a recording medium for recording content data requiring the copyright protection according to user's intention.

The invention claimed is:

1. An apparatus capable of mounting a recording medium for recording content data, the apparatus comprising:
an information acquisition section that acquires protection information from a server, wherein the protection information indicates whether or not content data supplied from the server needs to be protected;
a protection determination section that determines whether or not the content data needs to be protected according to the protection information acquired by the information acquisition section;
an ID-prerecorded medium determination section that searches a plurality of recording media mounted on the apparatus and selects a recording medium which is prerecorded with a unique identification code which uniquely identifies the recording medium, thereby determining the unique identification code for use in protecting the content data, the ID-prerecorded medium determination section, when the ID-prerecorded medium determination section has checked one recording medium and the checked one recording medium is prerecorded with no unique identification code, determining whether all of the recording media are searched or not, and checking another recording medium when the ID-prerecorded medium determination section determines that not all of the recording media have been searched;
a recording destination settling section that operates when the protection determination section determines that the content data needs to be protected and when the ID-prerecorded medium determination section selects the recording medium having the unique identification code, for settling the recording medium having the unique identification code to be a content recording destination;
a data acquisition section that acquires content data from the server;

an encryption section that operates when the data acquisition section acquires the content data which is to be protected, for encrypting the content data using the determined unique identification code; and a data recording section that records the content data encrypted by the encryption section in the recording medium settled to be the content recording destination by the recording destination settling section, and that operates when content data acquired by the data acquisition section need not be protected, for recording the acquired content data without encryption thereof in any of the plurality of recording media mounted on the apparatus regardless of having a unique identification code.

2. The apparatus according to claim 1, wherein
the recording destination settling section comprises an information presentation section that presents information about the recording medium prerecorded with the unique identification code, and a recording destination determination section that determines the content recording destination in accordance with a user operation which is inputted in response to the presenting of the information.

3. The apparatus according to claim 1, further comprising a priority holding section that holds priority information which determines priorities among a plurality of recording media mountable on the apparatus, wherein the ID-prerecorded medium determination section selects one of the recording media having the highest priority according to the priority information.

4. The apparatus according to claim 3, wherein the ID-prerecorded medium determination section searches the plurality of the recording media in the order of their priorities.

5. A method of recording content data by use of an apparatus capable of mounting a recording medium, the method comprising the steps of:

acquiring protection information from a server, wherein the protection information indicates whether or not content data supplied from the server needs to be protected;

determining whether or not the content data needs to be protected according to the acquired protection information;

searching a plurality of recording media mounted on the apparatus and selecting a recording medium which is prerecorded with a unique identification code which uniquely identifies the recording medium, thereby determining the unique identification code for use in protecting the content data, wherein:

checking one recording medium, when the checked one recording medium is prerecorded with no unique identification code, determining whether all of the recording media are searched or not, and checking another recording medium when it is determined that not all of the recording media have been searched;

settling the recording medium having the unique identification code to be a content recording destination when the content data needs to be protected and when the recording medium selected has the unique identification code;

acquiring content data from the server;

encrypting the content data using the determined unique identification code when the content data acquired is to be protected; and recording the encrypted content data in the recording medium settled to be the content recording destination, and when content data acquired by the data acquisition section need not be protected, recording the acquired content data without encryption thereof in any of the plurality of recording media mounted on the apparatus regardless of having a unique identification code.

6. A non-transitory computer readable storage medium for use in a recording apparatus having a processor and being capable of mounting a recording medium, the non-transitory computer readable storage medium containing program instructions executable by the processor-for causing the recording apparatus to perform a method of recording content data comprising the steps of:

acquiring protection information from a server, wherein the protection information indicates whether or not content data supplied from the server needs to be protected;

determining whether or not the content data needs to be protected according to the acquired protection information;

searching a plurality of recording media mounted on the apparatus and selecting a recording medium which is prerecorded with a unique identification code which uniquely identifies the recording medium, thereby determining the unique identification code for use in protecting the content data, wherein:

checking one recording medium, when the checked one recording medium is prerecorded with no unique identification code, determining whether all of the recording media are searched or not, and checking another recording medium when it is determined that not all of the recording media have been searched;

settling the recording medium having the unique identification code to be a content recording destination when the content data needs to be protected and when the recording medium selected has the unique identification code;

acquiring content data from the server;

encrypting the content data using the determined unique identification code when the content data acquired is to be protected; and recording the encrypted content data in the recording medium settled to be the content recording destination, and when content data acquired by the data acquisition section need not be protected, recording the acquired content data without encryption thereof in any of the plurality of recording media mounted on the apparatus regardless of having a unique identification code.

* * * * *